(12) United States Patent
Meijer et al.

(10) Patent No.: US 7,788,651 B2
(45) Date of Patent: Aug. 31, 2010

(54) ANONYMOUS TYPES

(75) Inventors: Henricus Johannes Maria Meijer, Mercer Island, WA (US); Brian C. Beckman, Newcastle, WA (US); Paul A. Vick, Seattle, WA (US); Amanda Silver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1307 days.

(21) Appl. No.: 11/219,256

(22) Filed: Sep. 2, 2005

(65) Prior Publication Data

US 2007/0055962 A1 Mar. 8, 2007

(51) Int. Cl.
*G06F 9/45* (2006.01)
*G06F 9/44* (2006.01)

(52) U.S. Cl. .................. 717/140; 717/146; 717/159; 717/114

(58) Field of Classification Search .................. None
See application file for complete search history.

(56) References Cited

U.S. PATENT DOCUMENTS

| | | | | |
|---|---|---|---|---|
| 6,112,199 | A * | 8/2000 | Nelson | 1/1 |
| 6,708,222 | B1 * | 3/2004 | Dalal et al. | 719/315 |
| 7,047,249 | B1 * | 5/2006 | Vincent | 1/1 |
| 7,275,079 | B2 * | 9/2007 | Brodsky et al. | 709/203 |
| 7,389,498 | B2 * | 6/2008 | Meijer et al. | 717/141 |
| 7,669,184 | B2 * | 2/2010 | Bracha et al. | 717/116 |
| 2002/0138819 | A1 * | 9/2002 | Hills | 717/114 |
| 2002/0147725 | A1 * | 10/2002 | Janssen et al. | 707/100 |
| 2003/0037051 | A1 * | 2/2003 | Gruenwald | 707/7 |
| 2004/0268307 | A1 * | 12/2004 | Plesko et al. | 717/114 |
| 2005/0177578 | A1 * | 8/2005 | Chen et al. | 707/100 |
| 2005/0246716 | A1 * | 11/2005 | Smith et al. | 719/315 |
| 2006/0179075 | A1 * | 8/2006 | Fay | 707/102 |
| 2006/0195460 | A1 * | 8/2006 | Nori et al. | 707/100 |
| 2006/0212861 | A1 * | 9/2006 | Tarditi et al. | 717/146 |
| 2006/0288345 | A1 * | 12/2006 | Rice et al. | 718/1 |
| 2007/0006141 | A1 * | 1/2007 | Bracha et al. | 717/108 |
| 2007/0027862 | A1 * | 2/2007 | Meijer et al. | 707/5 |
| 2007/0055962 | A1 * | 3/2007 | Meijer et al. | 717/140 |

OTHER PUBLICATIONS

Dare Obasanjo, Introducing Comega, Jan. 12, 2005, Published on XML.com, pp. 1-12.*
Patrick Smacchia; Introduction to C# Anonymous Methods; Dec. 28, 2004; TheServerSide.NET; pp. 1-14.*

* cited by examiner

*Primary Examiner*—Michael J Yigdall
*Assistant Examiner*—Hanh T Bui
(74) *Attorney, Agent, or Firm*—Workman Nydegger

(57) ABSTRACT

A computer-implemented system for representing data comprises a position indicator that indicates a position of a datum within a group, a name indicator that optionally names the datum, and a value of the datum. A type to be assigned to the datum is derived from at least one of a name of the datum and the position of the datum within the group. Methods of using the system are also provided.

9 Claims, 8 Drawing Sheets

ANONYMOUS TYPES

BACKGROUND

Many modern programming languages support the concept of types. A type usually is statically assigned to some programming construct when source code that implements a programming construct is translated by a compiler into an executable computer program, that is, at compile time. This procedure is often called early binding. Alternatively, a type often can be late bound or assigned once enough information about the programming construct is known to be able to derive or deduce the appropriate type for that programming construct. Some high-level programming languages, along with compilers that support those languages, can support both early and late bindings.

Computing systems increasingly must work with data from diverse sources. Often the data with which these systems must work is in a variety of different formats and representations. Each of these formats and representations has its own strengths and weaknesses. Choice among formats is a common problem encountered by software developers.

Among the most popular of formats for data are formats based upon a relational data model. This model is commonly applied in relational databases that often allow queries of stored data using an implementation of a relational calculus. Query results often imply a projection of members of various source values into a new target value. Software developers often find it inconvenient or impractical to project into a named or nominal type. Current systems commonly require use of named or nominal types and fail to provide an effective alternative to ease programming burdens for software developers.

SUMMARY

The following presents a simplified summary in order to provide a basic understanding and high-level survey. This summary is not an extensive overview. It is neither intended to identify key or critical elements nor to delineate scope. The sole purpose of this summary is to present some concepts in a simplified form as a prelude to the more detailed description later presented. Additionally, section headings used herein are provided merely for convenience and should not be taken as limiting in any way.

An anonymous type can be constructed from an access list of ordered name-value pairs. The anonymous type is both expressible and denotable, allowing for use in programming languages. This programming construct can be used to access data in situations when a programmer does not desire to declare a new type or simply desires the flexibility afforded by an anonymous type.

Members of an anonymous type can be assigned types by using named access of members or indexed (positional) access. Names of members can be duplicated, allowing for ready use with data sources such as XML documents that allow for name duplication. Members can also be unnamed. Positional access can be absolute in the sense that each member occupies an ordered position or relative in the sense that members sharing a duplicated name each have an index relative to others with that name.

The disclosed and described components and methods comprise one or more of the features hereinafter described and particularly pointed out in the claims. The following description and the annexed drawings set forth in detail certain specific illustrative components and methods. However, these components and methods are indicative of but a few of the various ways in which the disclosed components and methods can be employed. Specific implementations of the disclosed and described components and methods can include some, many, or all of such components and methods, as well as their equivalents. Variations of the specific implementations and examples presented herein will become apparent from the following detailed description when considered in conjunction with the drawings.

BRIEF DESCRIPTION OF THE DRAWINGS

FIG. 7 is a block diagram of an exemplary computing environment.

DETAILED DESCRIPTION

Figure 1:
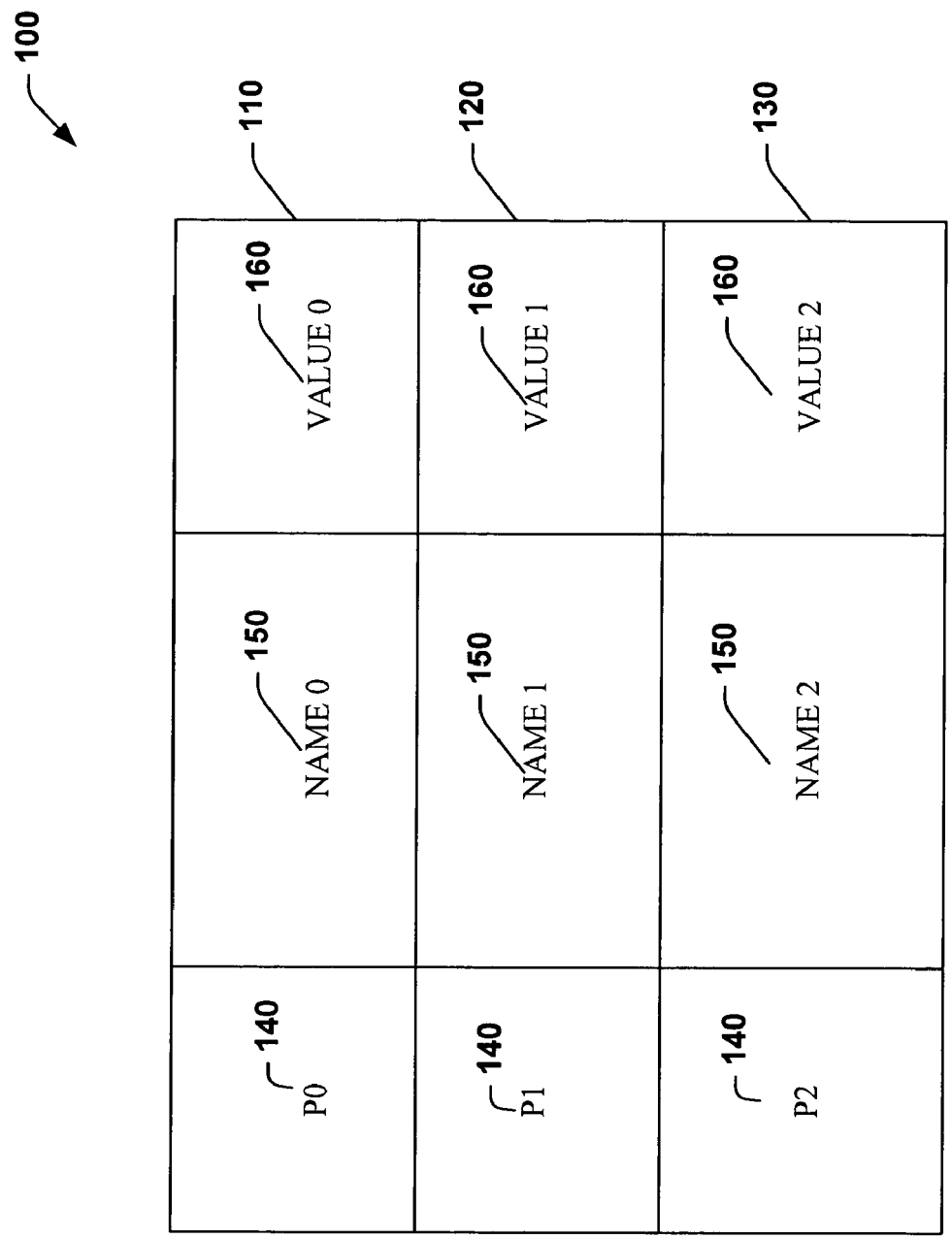
FIG. 1 is a block diagram of an assignment list.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

It should also be appreciated that although specific examples presented may describe or depict systems or methods that are based upon components of personal computers, the use of components and methods disclosed and described herein is not limited to that domain. For example, the disclosed and described components and methods can be used in a distributed or network computing environment. Additionally or alternatively, the disclosed and described components and methods can be used on a single server accessed by multiple clients. Those of ordinary skill in the art will readily recognize that the disclosed and described components and methods can be used to create other components and execute other methods on a wide variety of computing devices.

FIG. 1 is a block diagram of an assignment list 100. The assignment list 100 can be used to create ordered name-value pairs that can describe some datum. These ordered name-value pairs can be used to assign a type to a datum.

The assignment list 100 includes a plurality of rows. Each row 110, 120, 130 of the plurality of rows includes a position field 140, a name field 150, and a value field 160. This configuration can provide a flexible framework for indexed access of name-value pairs. Also, this configuration can be used to access metadata that can be used by a compiler to assign a type to a specific name-value pair. Such a scheme can be used when working with relational data, among other forms of data.

When using relational data, programmers can use a query language such as the structured query language (SQL) or another suitable language. When so doing, programmers ideally would like to write queries in a form similar to the following.

```
Select name, age
From Customers
Where Customers.age > 42
```

A query of this form can return a value that has a name field and an age field. This returned value can be used to create a tuple. However, the constructed tuple, as well as its name and age fields, has no named type.

Metadata can be used to derive or deduce a type for the tuple or its fields, or both. For example, the value "3" can have a type Integer. The value "True" can have a type Boolean. Similarly data rows or tuples can be assigned types based upon values. Consider the following data row.

Name="Erik", Age=42

This data row can be given the following type description.

{Name As String, Age As Integer}

The given type description can be used as a notation for a type.

Throughout this disclosure, such types are sometimes referred to as anonymous types. Anonymous types can be described as having two main features. First, such types are expressible. It is possible to construct an expression whose value is an association list. Second, anonymous types are denotable. It is possible to declare a variable whose type is an association list. The following exemplary code segment can further illustrate these points.

A query can be written as follows.

```
Dim R = Select    { Name = C.Name
                    Age = C.Age
                  }
          From C in Customers
          Where C.Age > 42
```

Applying the previously presented type description, this query can result in R having the following type.

```
IEnumerable (Of    { Name As String,
                     Age As Integer
                   })
```

Figure 2:
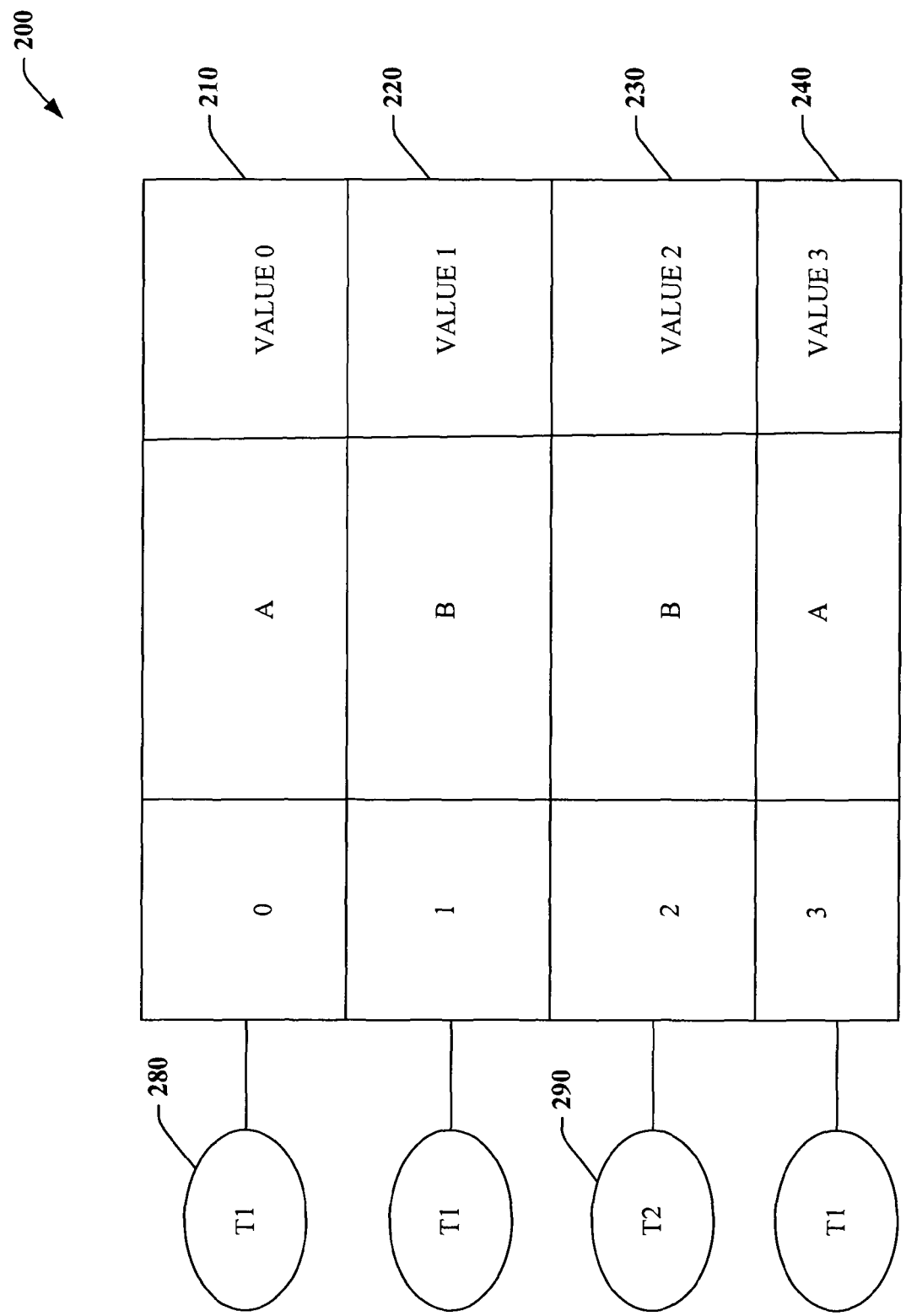
FIG. 2 is a system block diagram of an association list.

FIG. 2 is a block diagram of an association list 200. The association list 200 includes ordered rows 210, 220, 230, 240 of name-value pairs. Each row 210, 220, 230, 240 of name-value pairs includes a position 250, a name 260, and a value 270. Each row 210, 220, 230, 240 also has an associated first type 280 or a second type 290. As illustrated, names can be duplicated. Usually, such name duplication is prohibited, especially in data sources like relational databases where column names within a table must be unique. However, such name duplication is common in data sources created using extensible markup language (XML).

Consider the following exemplary code segment that illustrates name duplication.

```
Dim Verse =    {    .A = "I",
                    .B = "am",
                    .B = "not the",
                    .A = "Dancing Queen"
               }
```

This code segment can correspond to the following segment from an XML data document.

```
<Verse>
    <A> I </A>
    <B> am </B>
    <B> not the </B>
    <A> Dancing Queen </A>
</Verse>
```

The allowance of name duplication can give rise to a need for an ability to disambiguate names so that each name can be uniquely identified. This need can be addressed at the programming language level by providing indices for members of Verse. For example, to access "I", a value can be obtained by accessing Verse (0) to obtain a value from the zero-th position of Verse. Verse (2) can yield the value not the. Alternatively or additionally, Verse. A (0) can be accessed as the zero-th position A. Accessing Verse. A (1) would similarly yield the value Dancing Queen.

Unnamed values can also be allowed. Consider the following exemplary code segment.

Dim Pair={True, 3.14}

Types of the members of Pair are Boolean and Float, respectively. Also, the type of Pair itself is {Boolean, Float}. In this specific example, order of members matters. Members are unnamed, therefore named access is unavailable. Positional access can be used to obtain a value of each member and assign a type to a member.

To support use of unnamed members, compiler-generated names or hidden names can be used as part of the implementation. For example, the following can be implemented as part of a compiler to account for the members of Pair.

```
{
    Foo$5 = true
    Foo$8 = 3.14
}
```

The concepts and examples presented above can also be combined. For instance, a declared item can include not only unnamed members but also duplicate names of members. In such case, positional access, either absolute or relative can be used to obtain information from or about the members. In this context, absolute indexing can refer to indexing based upon all members of an object. Relative indexing can refer to indexing of members having duplicated names.

Indexing in this manner can also be used when members have the same duplicated name but different types. For example, consider the following type description.

{A As Boolean, A As String}

A compiler that supports positional access in the manner disclosed and described herein can be used to provide different types for members having the same name. If a static type of a member is known at compile time, that type can be early bound. For example, consider the following exemplary code segment based upon the foregoing Verse example.

Dim Line=Verse.A (0)

Line has type String because A (0) has type String. If this fact is known at compile time, the String type can be early bound. If not, type Object can be used.

Because members are ordered, positional access can be used. If the index is known statically, the compiler can return the known type. If the index is not known statically, the type can be Object. If a name is specified, and that name is unique, then it is possible to know statically the type of the named member. If the name is a duplicate, it is possible to index further. If the index is statically known, the compiler will know the type. If not, the type can be Object. In a case where a member is unnamed, a positional index can be used. If that index is known statically, the type is known. If not, the type can be Object.

Another example follows. Consider the following exemplary code segment of a type description.

```
X As
{       ..., A As TA_0, ...       // ith member
        ..., A As TA_1, ...       // jth member
        ..., B As TB, ...         // kth member
        ..., TC, ...              // lth member
}
```

Using indexed access, X (I), I can be a compile-time constant. In this case, it can be determined that the type of X (j) is X (j) As $TA_1$. Alternatively, when the compiler works with X (E) where E is some expression, X (E) can be typed as Object. Using named access, when unique names are used, X.B As TB is evident. When duplicate names are used, relative indexing can be used. Here, in the case of X.A (I) where I is a compile-time constant, X.A (0) As $TA_0$. Where I is not a compile-time constant, X.A (E) As Object.

Implementation of anonymous types can take a variety of forms. Such forms can be largely dependent upon choices of a specific implementer, including choice of a specific programming language with which anonymous types are to be used. Among possible implementations are those that use a designated interface class. Also possible are implementations that use a special compiler-only class. Erasure methods can also be applied as part of the implementation.

Consider the following exemplary code segment.

```
Dim X As {Name As String, Age As Integer}
    // erasure to:
Dim X As IAssociationList or
Dim X As Object
```

In this example, the runtime environment does not know anything about the type {Name As String, Age As Integer}. Erasure is used to obtain a type that can be directly supported. Erasure can be to any interface that can support an association list or even to just the Object base type. The compiler tracks X for typing.

```
X.Name
    // is erased to
CType (X.["Name"], String)
```

To implement association lists, a compiler may have one class that implements an interface to be used in all cases. The compiler knows statically that it needs to convert an anonymous type and can generate a class that implements IAssociationList in response to handling an association list in code. For example, the following approach shown in an exemplary code segment can be used.

```
Class SpecialClass Implements IAssociationList
    Dim Name As String
    Dim Age As Integer
    ...
End Class
```

The compiler can then directly access its own implementation.

The interface is some appropriate interface that allows for support of all necessary operations. Code written and compiled can be compiled into an assembly for a runtime environment. Multiple assemblies can exist and can be compiled from the same source code. Consider two assemblies, A1 and A2.

```
A1:
    Class C
        Dim X As Int
    End Class
A2:
    Class C
        Dim X As Int
    End Class
```

A1.C is not the same as A2.C. The runtime environment sees the types as different because types are normally restricted within an assembly. To avoid this problem, both classes implement IAssociationList as a type of a third assembly to be able to pass types between assemblies. The approach can be used to provide a type that can be used across any boundary within which types are usually restricted. Use of a common interface or base type in this manner can avoid the need for structural types.

Figure 3:
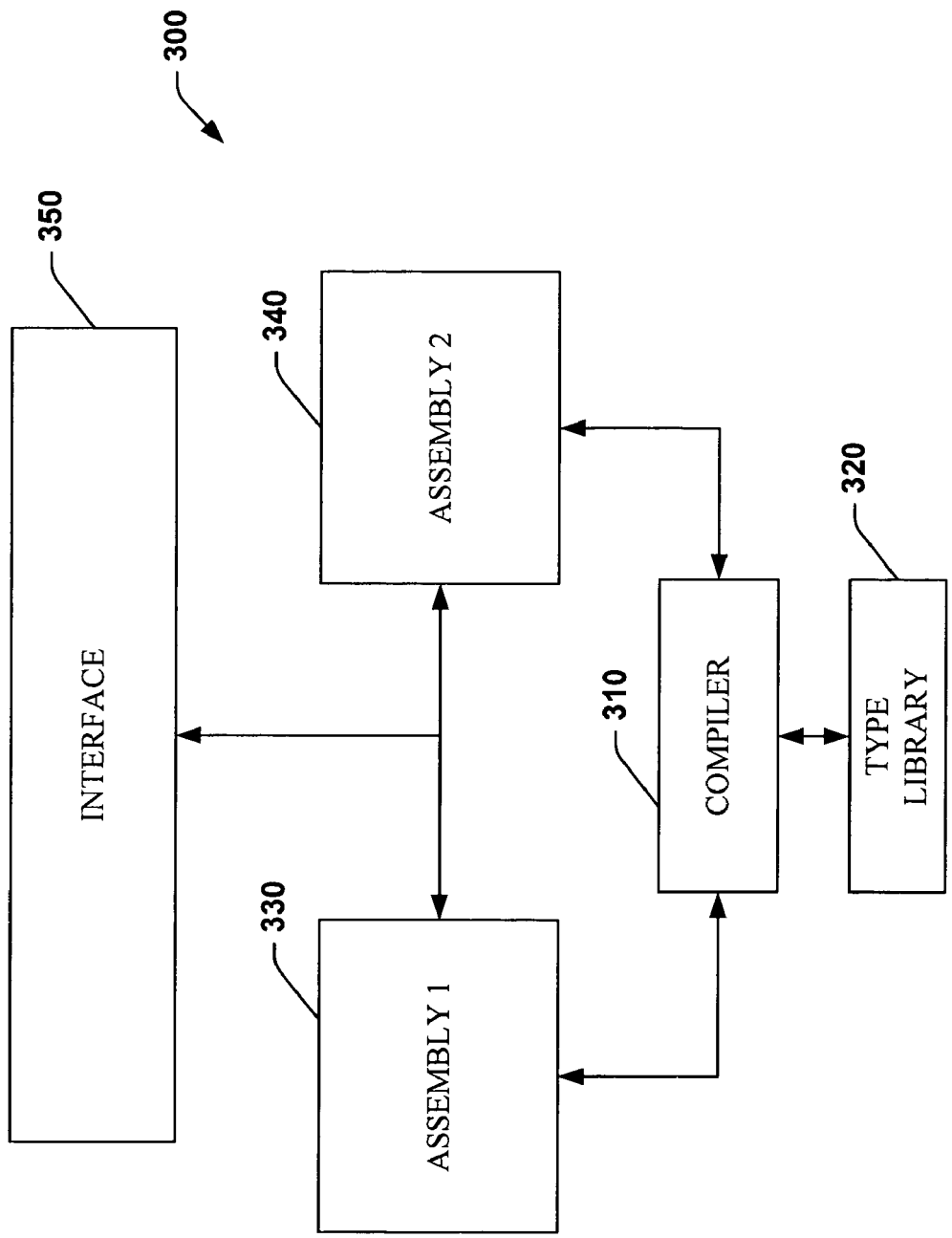
FIG. 3 is a system block diagram of a cross-assembly interface system.

FIG. 3 is a system block diagram of a cross-assembly interface system 300. The cross-assembly interface system 300 can provide a uniform or common type view for association lists across assemblies. Additionally or alternatively, the cross-assembly interface system 300 can be used to provide a uniform or common type view for association lists across any boundary that constrains types.

A compiler 310 can support a high-level programming language and specifically can translate computer source code written in that high-level programming language into machine-executable code. The compiler 310 can access a type library 320 as part of that conversion to obtain any needed typing information. Source code can be compiled into assemblies 330, 340. Assemblies 330, 340 can be created from the same source code or from different sources of code. An interface 350 can provide a common typed view to the assemblies 330, 340 such that both assemblies 330, 340 see instances of that interface as the same type.

Figure 4:
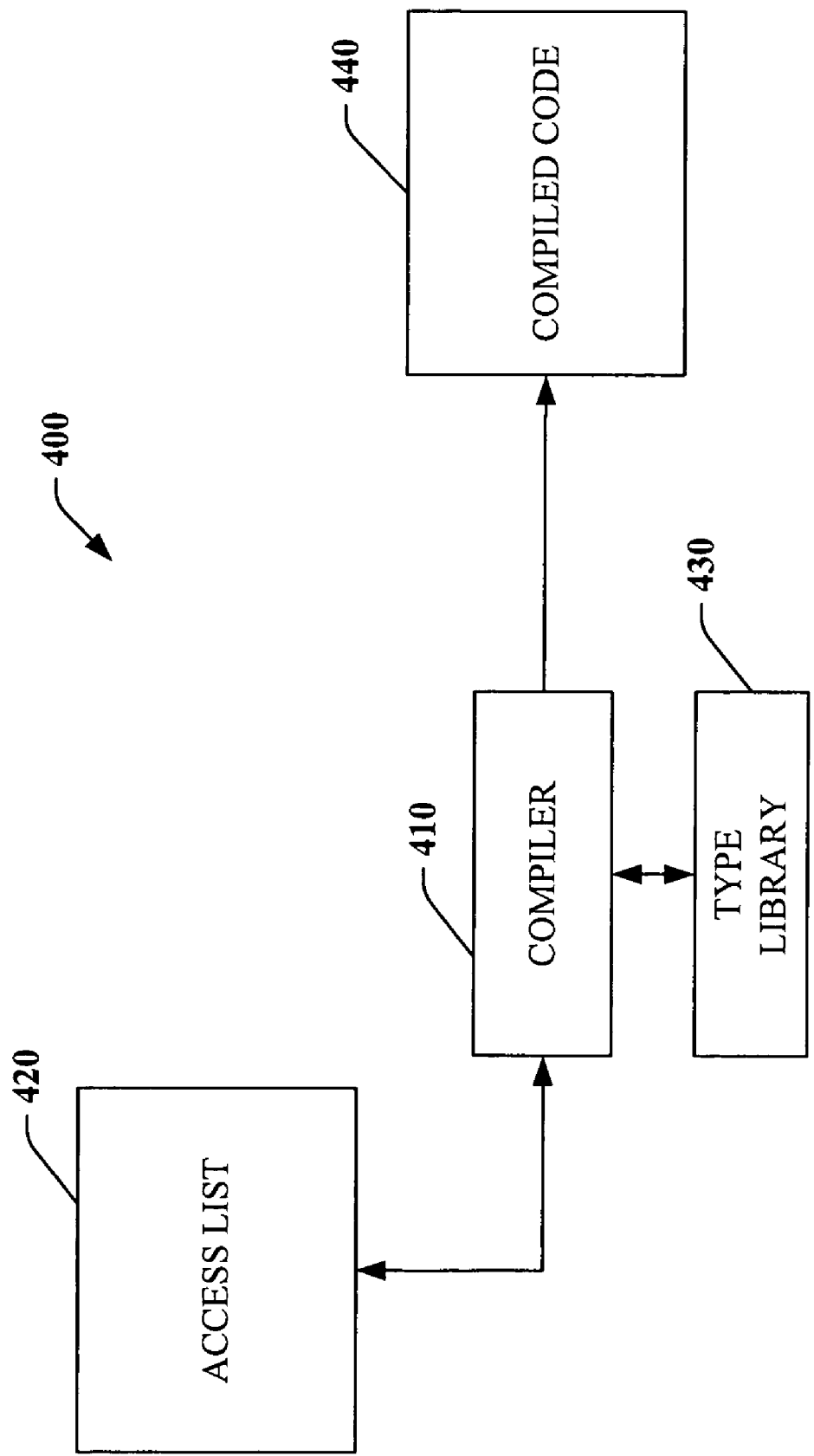
FIG. 4 is a system block diagram of a compiler system.

FIG. 4 is a system block diagram of a compiler system 400 that can implement association lists. The compiler system 400 can be used to generate compiled code from source code that includes anonymous types. The system 400 includes a compiler 410. The compiler 410 can support a high-level programming language and specifically can convert source code written in that supported high-level programming language to machine-executable code. As part of that conversion, the compiler can implement anonymous types in at least one of the ways disclosed and described previously.

Source code 420 can include an association list. This source code can be an input for the compiler 410 as part of a conversion to machine-executable code or other creation of an executable software program. The compiler 410 can also access a type library 430 as part of its operation when assigning types to programming constructs included in the source code 420. The compiler 410 can output compiled code 440.

In operation, the compiler system 400 can function as follows. The compiler 410 accesses the source code 420 and begins processing the source code 420 by scanning and parsing the code. When the compiler 410 identifies an anonymous type, the compiler 410 can implement the anonymous type in one of the ways mentioned in conjunction with earlier figures. As part of that implementation, the compiler 410 can access a type library 430 to obtain needed type information. The compiler 410 outputs compiled code 440 that can be executed by a computer.

Figure 5:
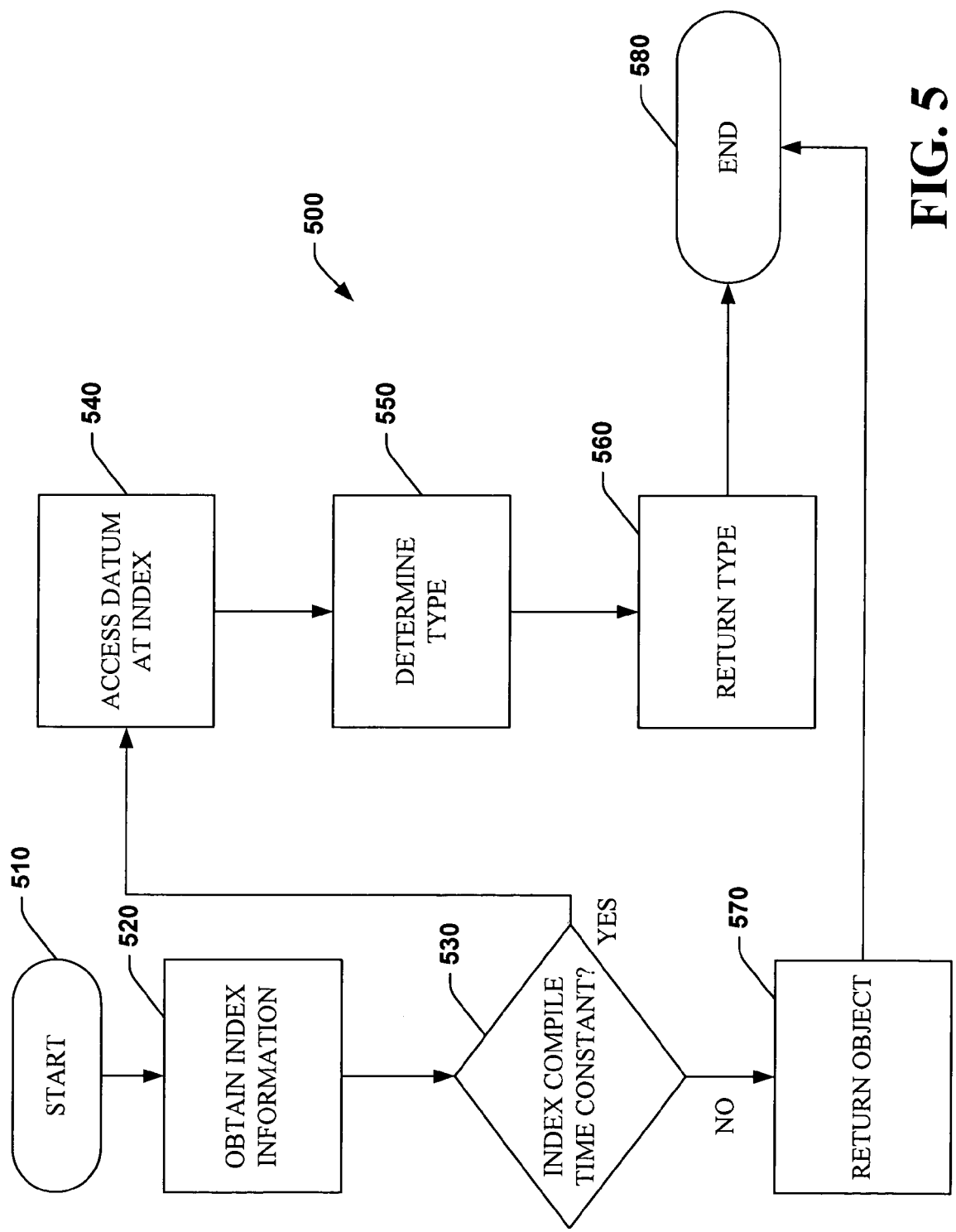
FIG. 5 is a flow diagram depicting a general processing flow of a method that can be employed in accordance with components that are disclosed and described herein.
Figure 6:
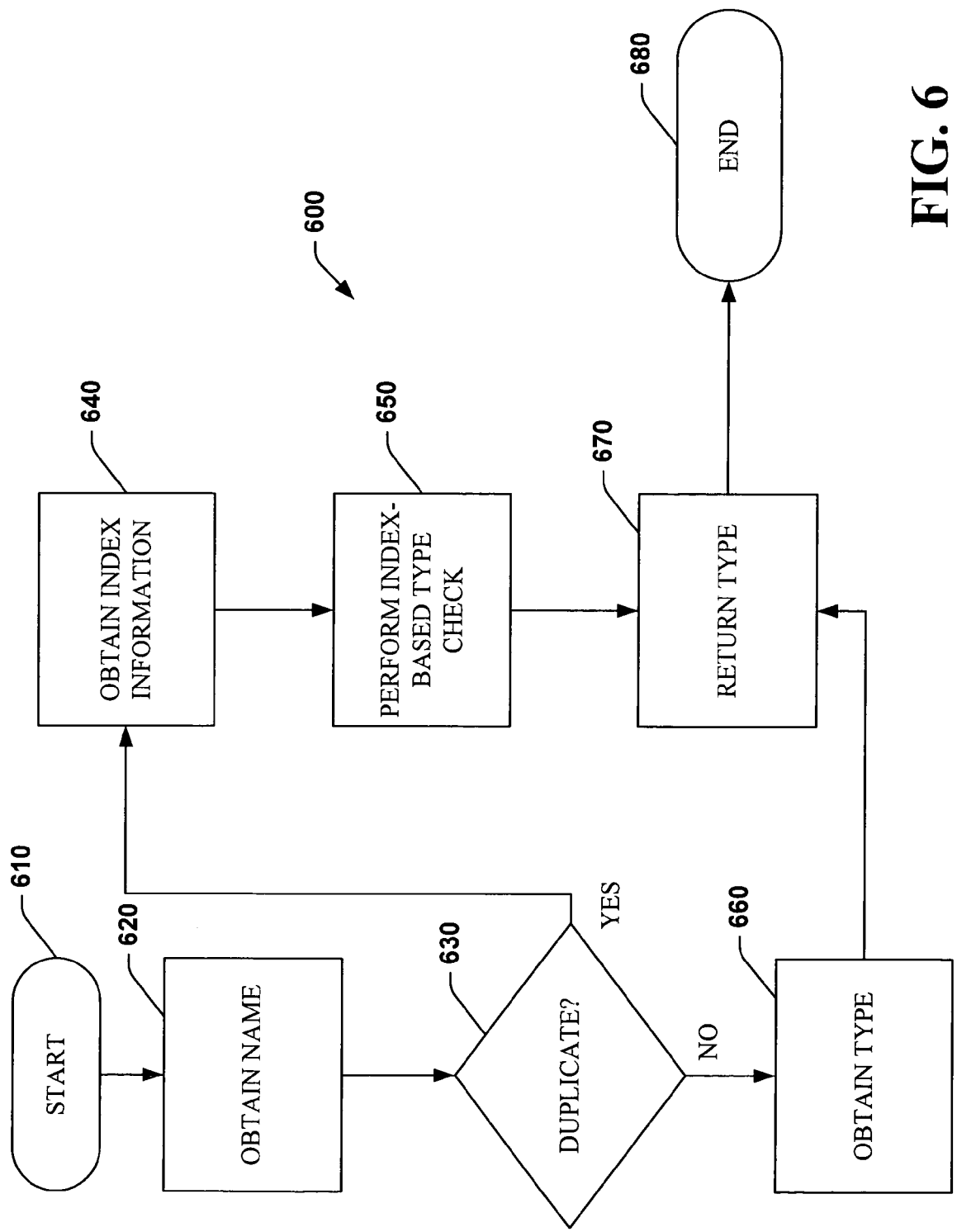
FIG. 6 is a flow diagram depicting a general processing flow of a method that can be employed in accordance with components that are disclosed and described herein.
Figure 7:
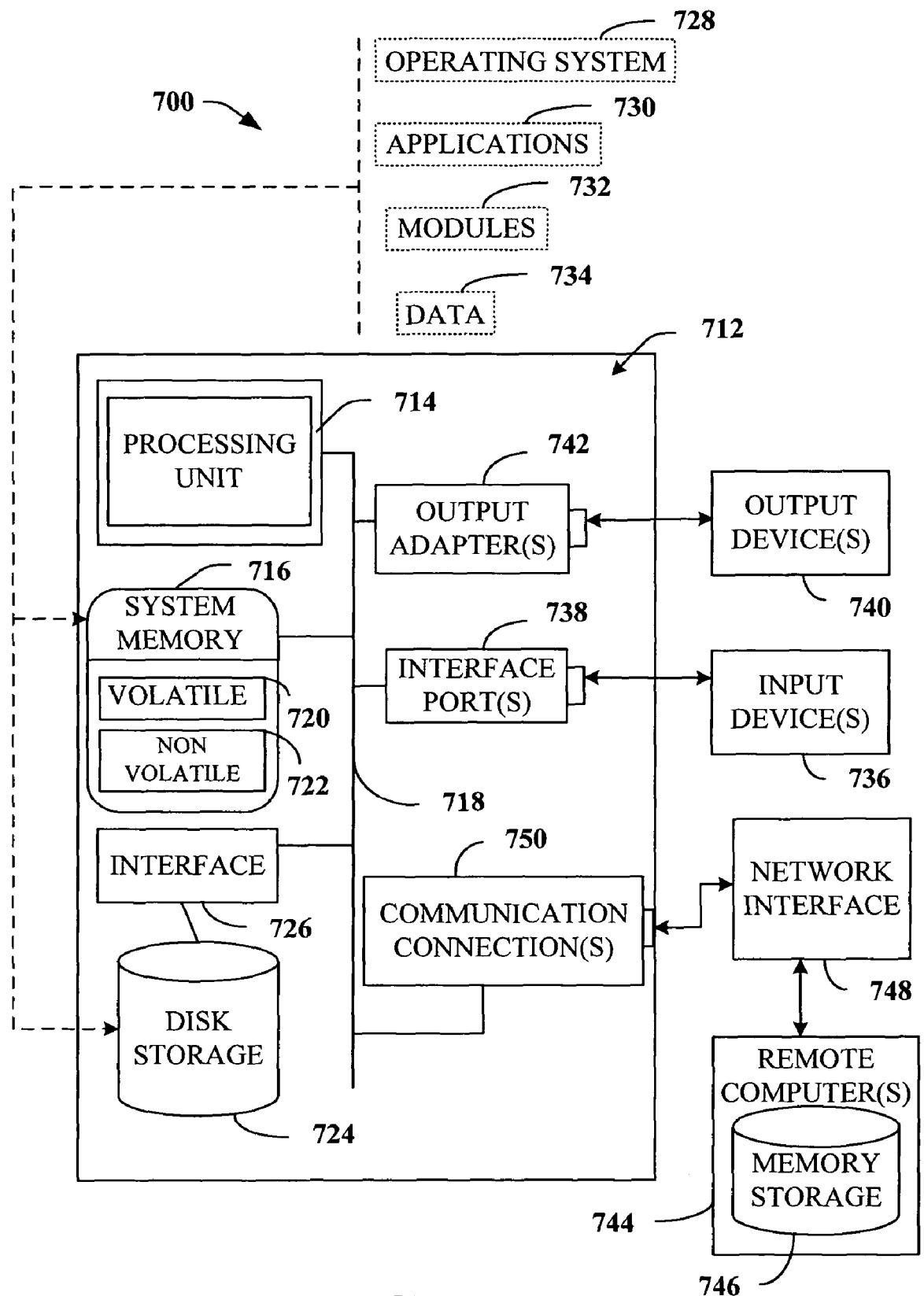
FIG. 7 is a flow diagram depicting a general processing flow of a method that can be employed in accordance with components that are disclosed and described herein.

With reference to FIGS. 5-7, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

FIG. 5 is a flow diagram depicting a general processing flow of a method 500 that can be employed in accordance with components that are disclosed and described herein. The method 500 can be used to assign type information to a programming construct. Specifically, the method 500 can be used to discern a type based upon positional information.

Processing of the method 500 begins at START block 510 and continues to process block 520. At process block 520, information about the position of a member of an object is obtained. This positional information can specifically include a value of an absolute or relative index of the member or an expression that can be evaluated to provide such a value. Processing continues to decision block 530 where a determination is made whether the positional information is a compile-time constant. If this determination is yes, processing of the method 500 continues to process block 540. At process block 540, information regarding the member located at the index value is accessed. A type of that member that is statically known is determined at process block 550. That type is returned at process block 560.

If the determination made at decision block 530 is no, processing of the method 500 continues to process block 570. At process block 570, a general or default type of Object is returned. Processing from either process block 560 or process block 570 terminates at END block 580.

FIG. 6 is a flow diagram depicting a general processing flow of a method 600 that can be employed in accordance with components that are disclosed and described herein. The method 600 can be used to assign type information to a programming construct. Specifically, the method 600 can be used to discern a type based upon name information.

Processing of the method 600 begins at START block 610 and continues to process block 620. At process block 620, a name of a member of an object is obtained. At decision block 630, a determination is made whether the name of the member is a duplicated name. If yes, processing of the method 600 continues to process block 640. At process block 640, index information about the named member is obtained. An index-based type check is performed at process block 650 to determine a type of the named member. Specifically, any of the index-based type checks previously disclosed and described in conjunction with other figures can be used. Another suitable index-based type check can also be used.

If the determination made at decision block 630 is no, indicating that a unique name is used for the member, processing continues to process block 660 where a type of the member is obtained. Processing from either process block 650 or process block 660 continues to process block 670 where the obtained type of the member is returned. Processing concludes at END block 680.

Figure 8:
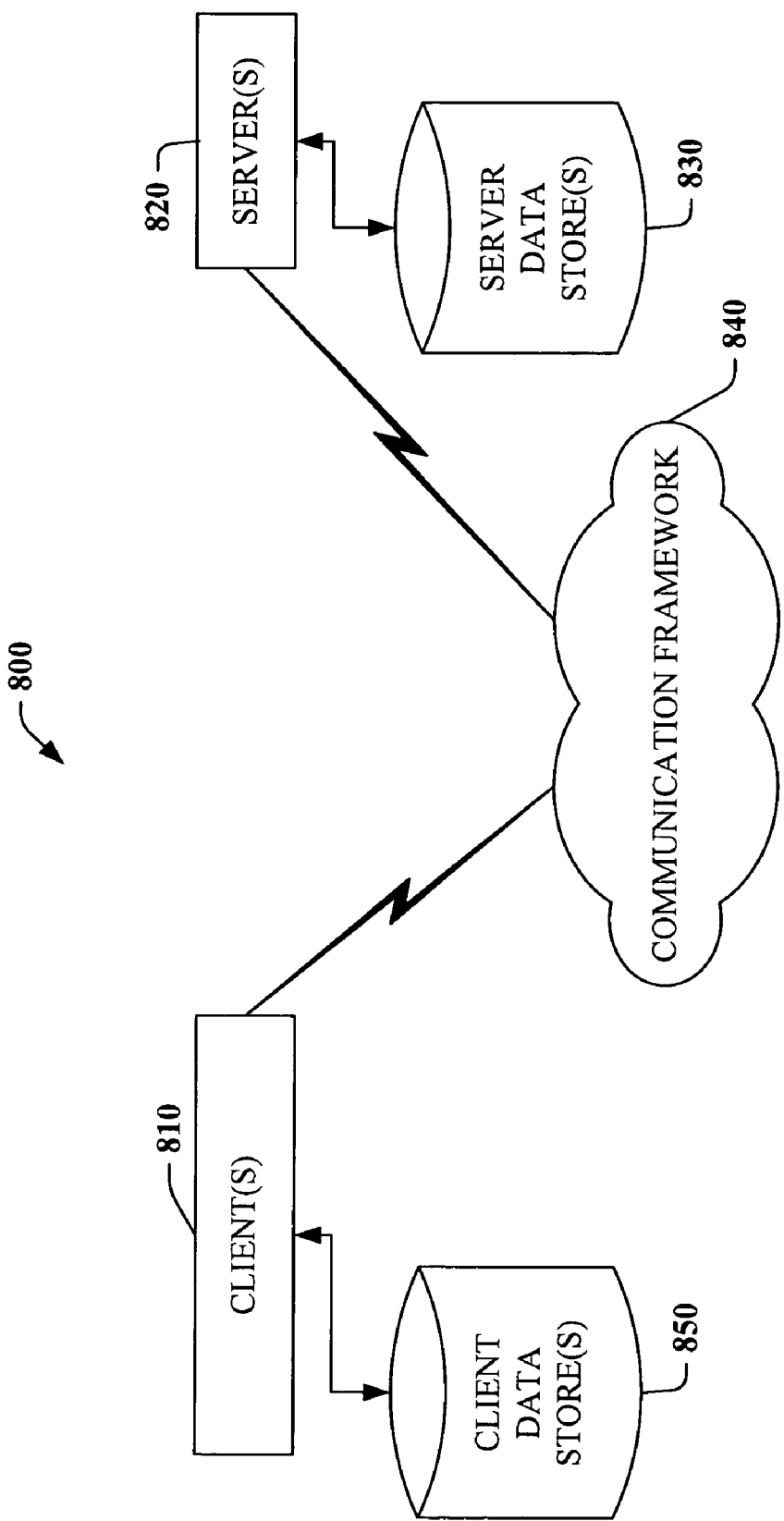
FIG. 8 is a system block diagram of an exemplary networking environment.

In order to provide additional context for implementation, FIGS. 7-8 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

With reference to FIG. 7, an exemplary environment 700 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/non-removable, volatile/non-volatile computer storage media. For example, FIG. 7 illustrates a disk storage 724. The disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in the suitable operating environment 700. Such software includes an operating system 728. The operating system 728, which can be stored on the disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the subject invention can be implemented with various operating systems or combinations of operating systems.

A user enters commands or information into the computer 712 through input device(s) 736. The input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

FIG. 8 is a schematic block diagram of a sample-computing environment 800 within which the disclosed and described components and methods can be used. The system 800 includes one or more client(s) 810. The client(s) 810 can be hardware and/or software (for example, threads, processes, computing devices). The system 800 also includes one or more server(s) 820. The server(s) 820 can be hardware and/or software (for example, threads, processes, computing devices). The server(s) 820 can house threads or processes to perform transformations by employing the disclosed and described components or methods, for example.

One possible means of communication between a client 810 and a server 820 can be in the form of a data packet adapted to be transmitted between two or more computer processes. The system 800 includes a communication framework 840 that can be employed to facilitate communications between the client(s) 810 and the server(s) 820. The client(s) 810 are operably connected to one or more client data store(s) 850 that can be employed to store information local to the client(s) 810. Similarly, the server(s) 820 are operably connected to one or more server data store(s) 830 that can be employed to store information local to the server(s) 840.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system for compiling code segments, the system comprising:
   a computer-readable storage medium having stored thereon a computer-executable compiler component, the compiler component configured to compile one or more code segments into assembly code, the one or more code segments including:
   a variable name assigned to an anonymous type that does not have a defined type prior to being compiled, the anonymous type including a plurality of fields including:
       a first field named a first name;
       a second field named the first name;
       a third field named a second name; and
       a fourth field named the second name; and
   a combined reference to the variable name and the first name of the first and second fields of the anonymous structure, the combined reference including a position indicator applied to the first name in the combined reference, the position indicator being configured to indicate a position of one of the first and second fields relative to the other of the first and second fields, but not relative to the plurality of named fields as a whole;
   wherein the compiler component compiles the anonymous type by converting the anonymous type into an instance of a class that implements the lAssociationList interface such that the compiled anonymous type is accessible across assembly boundaries during runtime.

2. The system of claim 1, wherein the position indicator, which is configured to indicate the position of one of the first and second fields relative to the other of the first and second fields, but not relative to the plurality of named fields as a whole, causes the combined reference to return an individual value of the first or second field that is at the position indicated by the position indicator, but not return both values of the first and second fields.

3. The system of claim 1, wherein the plurality of fields include one or more unnamed fields, and wherein the compiler component generates hidden names to assign to the unnamed fields during compilation.

4. A method for compiling code segments, the method comprising:
   receiving, at a compiler, one or more code segments that include an anonymous type comprising a variable name assigned to a plurality of fields, the anonymous type not having a defined type prior to being compiled, wherein the plurality of fields includes:
       a first field named a first name;
       a second field named the first name;
       a third field named a second name; and
       a fourth field named the second name; and
   wherein the one or more code segments further include a combined reference to the variable name and the first name of the first and second fields of the anonymous structure, the combined reference including a position indicator applied to the first name in the combined reference, the position indicator being configured to indicate a position of one of the first and second fields relative to the other of the first and second fields, but not relative to the plurality of named fields as a whole; and
   compiling the one or more code segments including compiling the anonymous type by converting the anonymous type into an instance of a class that implements the lAssociationList interface such that the compiled anonymous type is accessible across assembly boundaries during runtime.

5. The method of claim 4, wherein the position indicator, which is configured to indicate the position of one of the first and second fields relative to the other of the first and second fields, but not relative to the plurality of named fields as a whole, causes the combined reference to return an individual value of the first or second field that is at the position indicated by the position indicator, but not return both values of the first and second fields.

6. The method of claim 4, wherein the plurality of fields include one or more unnamed fields, and wherein the compiler component generates hidden names to assign to the unnamed fields during compilation.

7. A computer-implemented system for compiling code segments, the system comprising:
   a processor; and system memory storing a compiler component that is configured to compile one or more code segments into assembly code, the one or more code segments including:
a variable name assigned to an anonymous type that does not have a defined type prior to being compiled, the anonymous type including a plurality of fields including:
a first field named a first name;
a second field named the first name;
a third field named a second name; and
a fourth field named the second name; and
a combined reference to the variable name and the first name of the first and second fields of the anonymous structure, the combined reference including a position indicator applied to the first name in the combined reference, the position indicator being configured to indicate a position of one of the first and second fields relative to the other of the first and second fields, but not relative to the plurality of named fields as a whole;
wherein the compiler component compiles the anonymous type by converting the anonymous type into an instance of a class that implements the lAssociationList interface such that the compiled anonymous type is accessible across assembly boundaries during runtime.

8. The system of claim 7, wherein the position indicator, which is configured to indicate the position of one of the first and second fields relative to the other of the first and second fields, but not relative to the plurality of named fields as a whole, causes the combined reference to return an individual value of the first or second field that is at the position indicated by the position indicator, but not return both values of the first and second fields.

9. The system of claim 7, wherein the plurality of fields include one or more unnamed fields, and wherein the compiler component generates hidden names to assign to the unnamed fields during compilation.

* * * * *

UNITED STATES PATENT AND TRADEMARK OFFICE
CERTIFICATE OF CORRECTION

| | | |
|---|---|---|
| PATENT NO. | : 7,788,651 B2 | |
| APPLICATION NO. | : 11/219256 | |
| DATED | : August 31, 2010 | |
| INVENTOR(S) | : Henricus Johannes Maria Meijer et al. | |

It is certified that error appears in the above-identified patent and that said Letters Patent is hereby corrected as shown below:

In column 12, line 9, in Claim 1, delete "lAssociationList" and insert -- IAssociationList --, therefor.

In column 12, line 49, in Claim 4, delete "lAssociationList" and insert -- IAssociationList --, therefor.

In column 14, line 3, in Claim 7, delete "lAssociationList" and insert -- IAssociationList --, therefor.

Signed and Sealed this
Eighth Day of February, 2011

David J. Kappos
*Director of the United States Patent and Trademark Office*